United States Patent

Jacobellis

[15] 3,636,969

[45] Jan. 25, 1972

[54] RELIEF AND UNLOADING VALVE

[72] Inventor: Alphonse A. Jacobellis, Los Angeles, Calif.

[73] Assignee: Greer Hydraulics, Inc., Los Angeles, Calif.

[22] Filed: Feb. 17, 1970

[21] Appl. No.: 12,037

[52] U.S. Cl. ............................ 137/115, 137/469, 137/528, 92/92

[51] Int. Cl. .................................................. F16k 15/02

[58] Field of Search ............. 137/115, 469, 514, 514.5, 528, 137/529, 535; 92/91, 92

[56] References Cited

UNITED STATES PATENTS

| 2,411,574 | 11/1946 | Hunt | 137/115 X |
|---|---|---|---|
| 2,855,951 | 10/1958 | Orth | 92/92 X |
| 1,754,641 | 4/1930 | Mobley | 137/528 X |
| 2,556,867 | 6/1951 | Carlisle | 137/529 X |
| 3,017,897 | 1/1962 | Seguenot | 137/529 |
| 3,055,388 | 9/1962 | Tebb et al. | 137/469 |

*Primary Examiner*—Robert G. Nilson
*Attorney*—Arthur B. Colvin

[57] ABSTRACT

This invention relates to the art of relief and unloading valves which are connected to a hydraulic circuit to relieve excess pressure and more particularly a valve which has a deformable bladder which is precharged with gas under pressure to a value such as to retain a valve member in closed position until the fluid pressure in the circuit exceeds a predetermined amount, overcoming the force exerted by the charged bladder, at which time the valve member will open to relieve the fluid pressure.

1 Claims, 6 Drawing Figures

PATENTED JAN 25 1972

ALPHONSE A. JACOBELLIS

BY Arch B Colin
ATTORNEY

PATENTED JAN 25 1972
3,636,969
SHEET 2 OF 3
FIG. 2
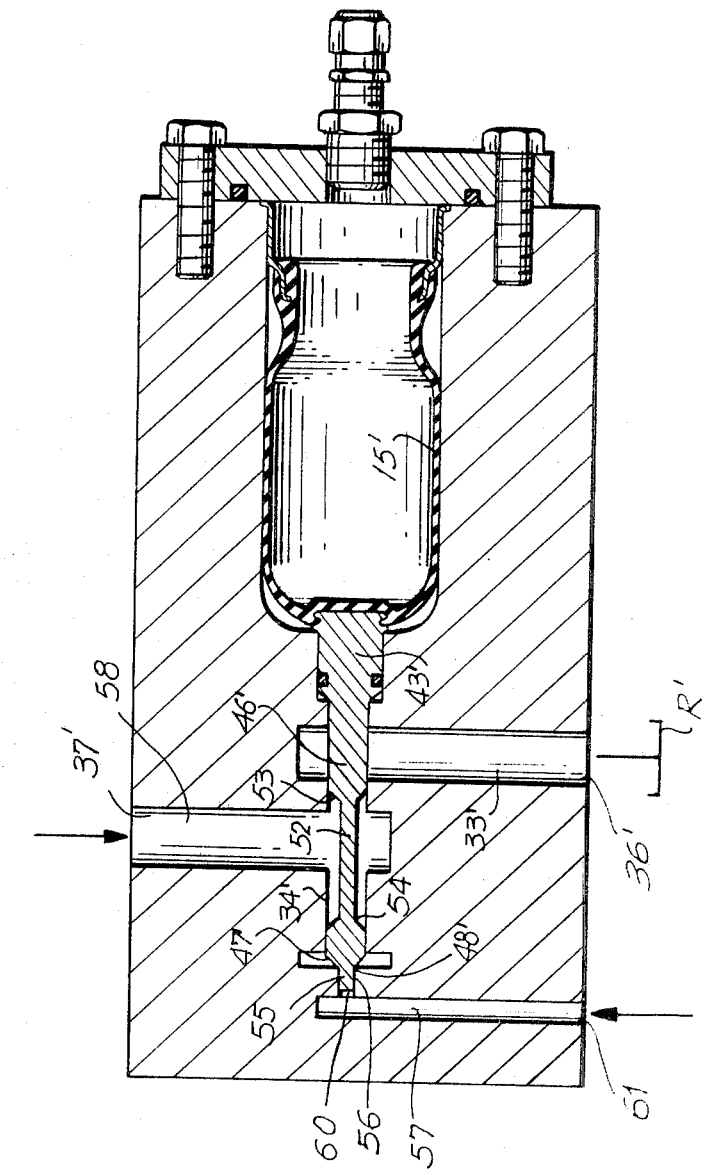
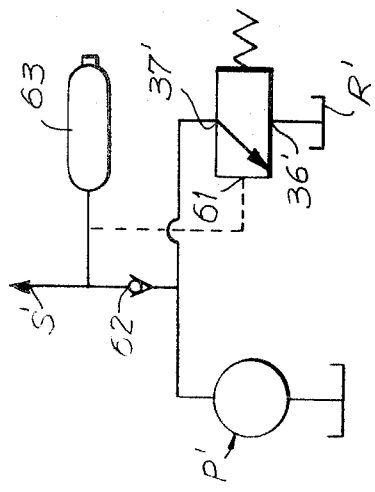
FIG. 2a
INVENTOR
ALPHONSE A. JACOBELLIS
BY
ATTORNEY

INVENTOR.
ALPHONSE A. JACOBELLIS

RELIEF AND UNLOADING VALVE

As conducive to an understanding of the invention, it is to be noted that where a relief or unloader valve is provided which utilizes a bellows to provide a preload on a valve member controlling relief of fluid pressure in the system, since the bellows is normally limited to a very low internal pressure, it cannot alone provide sufficient reaction against the valve member to be useful in a relatively high pressure system. Where springs are associated with the bellows to render the latter useful in relatively high pressure systems, the units are relatively complicated and fairly difficult to adjust. Furthermore, where springs are employed which tend to fatigue after repeated use, the accuracy of the valve is impaired.

It is accordingly among the objects of the invention to provide a bladder-operated relief and unloading valve which has relatively few parts and may readily be fabricated at relatively low cost and which permits the relief pressure settings to readily be changed to any desired value by merely changing into precharge pressure in the bladder.

According to the invention, these objects are accomplished by the arrangement and combination of elements hereinafter described and more particularly recited in the claims.

In the accompanying drawings in which are shown one or more of various possible embodiments of the several features of the invention:

FIG. 2 is a longitudinal sectional view of another embodiment of the invention incorporated in an unloading valve;

FIG. 2a is a diagrammatic view of a system incorporating the unloading valve of FIG. 2;

Figure 1:
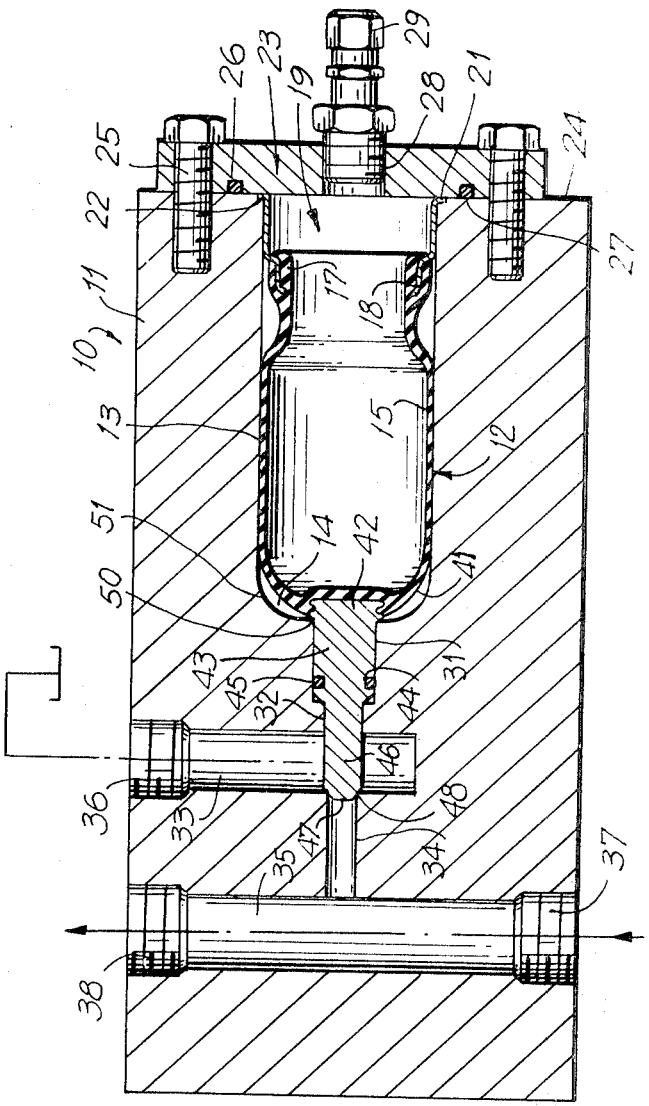
FIG. 1 is a longitudinal sectional view of one embodiment of the invention incorporated in a relief valve.
Figure 1A:
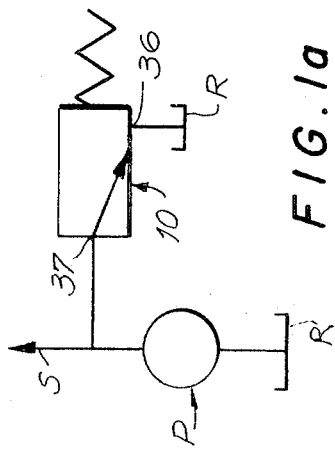
FIG. 1a is a diagrammatic view of a system incorporating the relief valve of FIG. 1.

Referring now to the drawings, as shown in FIG. 1, the relief valve 10 comprises a block or housing 11, having a cylindrical bore 12. The bore 12 has a large-diameter portion 13 at its outer end defining a chamber 14 in which a movable partition preferably in the form of a bladder 15 is positioned. The bladder 15 which may be of natural or synthetic rubber, has a large-diameter mouth with a thickened rim 17 which is molded integrally with the inner edge 18 of an annular supporting member 19. The supporting member 19 has an outwardly extending rim 21 which is seated in an annular recess 22 in the outer end of chamber 14.

The annular retaining member 19 is securely retained in position and the mouth of the bladder sealed from the exterior by means of a closure plate 23, which is retained against the end 24 of the housing 11 by screws 25. The plate preferably has an annular groove 26 in its undersurface in which an O-ring 27 is positioned to form a seal.

The plate 23 has a threaded opening 28 to receive a gas valve 29 by means of which the bladder may be charged with gas under pressure.

The bore 12 has a reduced diameter portion 31 and a further reduced diameter portion 32, both extending axially thereof, the latter leading into a transverse bore 33 extending partially through the housing 11. A further reduced diameter bore 34 axially aligned with the bore 12 extends from transverse 33 into a second transverse bore 35 extending completely through the housing 11. The outer end of bore 33 defines the relief port 36 of the valve. One end 37 of bore 35 defines the pressure inlet port to which a source of fluid under pressure such as a pump P, is connected and the other end 38 of bore 35 defines the pressure outlet port which is connected to a reservoir R for example.

The closed end 41 of the bladder 15 has molded integrally therewith a valve head 42 which preferably is formed integrally with a stem 43, the latter having a close sliding fit in the reduced bore portion 31. The stem has an annular groove 44 in which an O-ring 45 is positioned to define a seal. The stem 43 has a reduced diameter axial portion 46 which extends transversely through bore 33, the end 47 of said reduced diameter portion defining a valve adapted to be retained against the periphery of the opening 48 in bore 33 defined by the end of bore 34 exposed in transverse bore 33.

In operation of the relief valve shown in FIG. 1, the port 37 is connected to the source of fluid under pressure P and the port 38 is connected to the hydraulic system S to be actuated. The port 36 is connected to reservoir R.

The bladder 15 is charged with gas under pressure through the valve 29. As a result, the bladder will expand moving the free end 47 of the stem 43 against the periphery of opening 48 which forms a valve seat. As a result, no fluid can flow from the bore 35 into the relief bore 33.

Due to the fact that the valve head 42 will move against the periphery 50 of reduced bore portion 31, which defines a valve seat, extrusion of the closed end of the bladder is precluded, the rounded periphery 51 of the floor of chamber 14 preventing a sharp fold forming in the bladder when it seats there against thereby preventing cutting and possible rupture of the bladder.

The force resulting from the gas precharge in the bladder 15 which causes the valve stem 43 to move to the left, referring to FIG. 1, so that the end 47 thereof will be retained in sealing position against seat 48 is opposed by the force exerted by the fluid pressure in bore 35 reacting against such end 47.

Thus, it is a relatively simple matter to set the gas precharge to an amount such that the end 47 of stem 43 will remain seated until the pressure in the system exceeds a predetermined amount at which time such pressure in bore 35 reacting against end 47 of stem 43 will provide a force sufficient to overcome the force created by the precharge in bladder 15. This will cause the end 47 to move off its seat 48 for relief of fluid under pressure from bore 35 into relief bore 33 and then to the reservoir R.

The embodiment shown in FIG. 2 is similar in many respects to the embodiment shown in FIG. 1 and corresponding parts have the same reference numerals primed.

In the embodiment shown in FIG. 2, which is an unloader valve, the reduced portion 46' of the stem 43' extends transversely through the relief bore 33', the outer end 36' of which defines a relief port, connected to the reservoir R'. Stem 43' has a further reduced portion 52 defining two opposed identical reaction shoulders 53, 54. An additional reduced stem portion 55 extending axially beyond the shoulder portion 54, is slidably mounted in a reduced diameter end portion 56 of bore portion 34' which leads into a transverse pilot pressure bore 57, the end 60 of stem portion 55 being exposed in bore 57. The outer end of said pilot pressure bore 57 defines a pilot port 61 which is connected to the hydraulic system S'.

The reduced stem portion 52 extends through a transverse pressure bore 58, the outer end of which defines a pressure port 37' which is connected to the source of fluid under pressure P'.

As diagrammatically shown in FIGS. 2a, a one-way check valve 62 is connected between the hydraulic system S' to be actuated and the outlet of the pressure source or pump P' as well as to the port 37'. The pilot port 61 is connected directly to the hydraulic system S' and to a pressure accumulator 63 of conventional type.

As a result, fluid under pressure from the pump P' will flow through the one-way valve 62 into the system S' for normal utilization. The fluid under pressure from the pump P' will also be applied to port 37' and flow through bore 58 to react against identical reaction shoulders 53, 54. Since the force exerted against shoulders 53, 54 will be identical and opposed it will have no effect. Thus, it will only be the force exerted by the precharge in bladder 15' which will retain the reduced portion 46' of stem 43' extending completely through transverse bore 33' to cut off communication between inlet port 37' and relief port 36'.

It is to be noted that the fluid under pressure in pilot bore 57 connected to the hydraulic system S', will react against the end 60 of stem 43' opposing the force created by the precharge pressure in the bladder 15'. When the system pressure exceeds a predetermined amount, determined by the precharge pressure in bladder 15', it will cause the valve stem 43' to move to the right sufficiently so that the reduced diameter portion 52 of stem 43' will move into alignment with the relief bore 33' providing communication directly from the pump P' to the reservoir R'. As a result, the pump P' will unload into the reservoir rather than increasing the pressure in the system, the one-way valve 62 preventing unloading of the fluid under pressure in the system.

Figure 3:
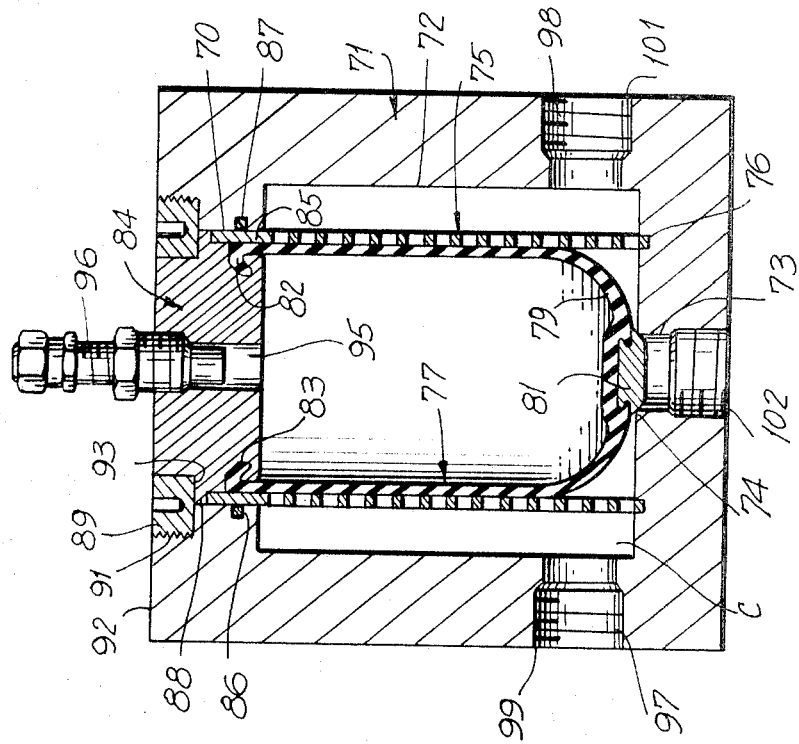
FIG. 3 is a longitudinal sectional view of another embodiment of a relief valve according to the invention.
Figure 3A:
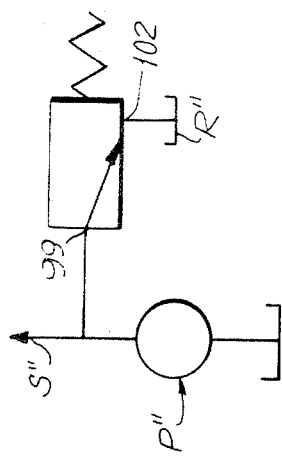
FIG. 3a is a diagrammatic view of a system incorporating the relief valve of FIG. 3.

In the embodiment shown in FIG. 3 which relates to a relief valve, the valve comprises a block or housing 71 having a central bore 72 of reduced diameter at its lower end defining a discharge or relief bore 73, the upper end 74 of said bore 73 defining a valve seat. The mouth of said central bore 72 is also of reduced diameter as at 70.

Positioned in the central bore 72 is a cylindrical perforated sleeve 75, the lower end of which is seated in an annular groove 76 in the floor of housing 71. Positioned in the perforated sleeve 75 is a deformable bladder 77, the closed end 79 of which mounts a valve head 81 designed to rest on the seat 74.

The open mouth of the bladder 77 has a inwardly extending annular rim 82 which is retained in a corresponding annular groove 83 in an end plug 84. The diameter of the end plug 84 is such that when it is forced into the upper end 85 of perforated sleeve 75, the mouth of the bladder will be forced against the inner surface of the sleeve 75 to form a seal, the reduced bore portion 70 having an annular groove 86 in which an O-ring 87 is positioned to formed a seal.

The end plug 84 has an annular flange 88 adapted to eat against the upper end of the perforated sleeve 75 to retain the latter in position. The plug 84 is securely yet releasably locked in the housing 71 by means of an annular locking member 89 which is screwed into a correspondingly threaded recess 91 in the upper end 92 of the housing, the inner periphery of the locking member 89 reacting against an annular shoulder 93 formed in the plug.

The plug 84 has an axial bore 95 in which a conventional gas valve 96 is positioned to permit charging of the bladder 77. Extending transversely into the central bore 72 are two passageways 97, 98 each having an associated port 99 and 101, the port 99 defining the pressure inlet port connected to the source of fluid under pressure P'', and the port 101 defining the pressure outlet port connected to the hydraulic system S'' The outer end of bore 73 defines a relief port 102 which is connected to the reservoir R''.

The operation of the relief valve shown in FIG. 3 is similar to the operation of the valve shown in FIG. 1. Thus, the bladder 77 is charged with gas under pressure through valve 96. As a result, the bladder will expand in sleeve 75 retaining the valve head 81 against its seat 74. The perforations in the sleeve 75 are of size such as not to permit extrusion of the bladder 77, yet to permit flow of fluid under pressure therethrough. The fluid from the pressure source P'' will flow through port 99 into the annular chamber C defined between the wall of bore 72 and the sleeve 75 and thence out of port 101 into the hydraulic system S''. The fluid under pressure will also react against the bladder 77 positioned in the sleeve, but so long as the force exerted by the precharged bladder is greater than the force exerted by the fluid under pressure, the bladder will not be collapsed and hence the valve 81 will remain on its seat 74 preventing relief of fluid under pressure in the reservoir.

If the fluid pressure should increase beyond a predetermined amount depending upon the precharge pressure in bladder 77, the bladder would collapse causing the valve 81 to be moved off its seat for relief of the pressure in the system.

Although in the preferred embodiment of the invention herein shown and described a bladder is used as the movable partition, it is within the scope of the invention to utilize a movable piston as the control member.

With the relief and unloader valves above described, it is a relatively simple matter to set the precharge pressure in the bladder to a desired amount to effect the proper control of the fluid in the system.

Having thus described my invention what I claim as new and desire to secure by Letters Patent of the United States is:

1. A valve for controlling relief of fluid under pressure in a hydraulic system, said valve comprising a casing having a bore therein defining a chamber, said chamber having a deformable bladder positioned therein, means to charge said bladder with gas under pressure, said casing bore having a reduced diameter portion extending axially from the inner end of said chamber and defining an opening in the inner end of said chamber the periphery of said opening defining a valve seat, a valve member secured to said bladder and movable against said seat, said casing having a first transverse relief bore intersecting said reduced diameter bore portion, the outer end of said relief bore defining a pressure relief port, said casing also having a second transverse bore, the ends of which define a pressure outlet port and a pressure inlet port respectively, said reduced diameter bore portion extending axially between said transverse bores to provide communication therebetween and having a portion exposed in said first transverse bore and defining an additional valve seat, a stem operatively connected at one end to said bladder and extending axially from said first valve member through the reduced diameter portion of said casing bore, the free end of said stem defining an additional valve member normally retained on said additional valve seat when said bladder is expanded to cut off communication between said second transverse bore and said first transverse bore, said additional valve member being subjected to the pressure in said second transverse bore, whereby when the pressure in the hydraulic system connected to said second transverse bore exceeds a predetermined amount said additional valve member will be moved off its seat to provide communication between said pressure port and said relief port.

* * * * *